US008541347B2

(12) United States Patent
Watkins et al.

(10) Patent No.: US 8,541,347 B2
(45) Date of Patent: Sep. 24, 2013

(54) HYDROCARBON-ACID EMULSION COMPOSITIONS AND ASSOCIATED METHODS

(75) Inventors: M. Hunter Watkins, Houston, TX (US); Robert S. Taylor, Calgary (CA); Mary van Domelen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 450 days.

(21) Appl. No.: 11/698,659

(22) Filed: Jan. 26, 2007

(65) Prior Publication Data
US 2008/0179062 A1 Jul. 31, 2008

(51) Int. Cl.
C09K 8/68 (2006.01)
E21B 43/25 (2006.01)
E21B 43/26 (2006.01)

(52) U.S. Cl.
USPC ........... 507/203; 507/923; 507/933; 166/307; 166/308.1

(58) Field of Classification Search
USPC .............. 166/307, 300, 308.1; 507/203, 923, 507/933
See application file for complete search history.

(56) References Cited

U.S. PATENT DOCUMENTS

| | | | | |
|---|---|---|---|---|
| 2,793,998 | A * | 5/1957 | Brainerd, Jr. et al. | 507/218 |
| 3,799,266 | A * | 3/1974 | Kiel | 166/308.4 |
| 4,140,640 | A * | 2/1979 | Scherubel | 507/244 |
| 4,237,974 | A * | 12/1980 | Scherubel | 166/281 |
| 4,267,887 | A * | 5/1981 | Watanabe | 166/300 |
| 5,082,056 | A | 1/1992 | Tackett, Jr. | 166/295 |
| 5,427,699 | A * | 6/1995 | Pauls et al. | 507/244 |
| 6,218,342 | B1 | 4/2001 | Patel | 507/129 |
| 6,488,091 | B1 | 12/2002 | Weaver et al. | 166/278 |
| 6,877,563 | B2 | 4/2005 | Todd et al. | 166/312 |
| 7,021,383 | B2 | 4/2006 | Todd et al. | 166/307 |
| 7,296,627 | B2 * | 11/2007 | Dyer | 166/304 |
| 2004/0152601 | A1 * | 8/2004 | Still et al. | 507/100 |
| 2005/0189110 | A1 | 9/2005 | Taylor et al. | 166/278 |
| 2005/0189111 | A1 * | 9/2005 | Taylor et al. | 166/278 |
| 2005/0197257 | A1 | 9/2005 | Bouwmeester | 507/120 |
| 2008/0035342 | A1 * | 2/2008 | Saini et al. | 166/279 |

FOREIGN PATENT DOCUMENTS

| | | |
|---|---|---|
| EP | 0278540 | 8/1988 |
| GB | 2163790 A | 3/1986 |

OTHER PUBLICATIONS

MSDS of World's Champion waterless hand cleaner, Jan. 2009 (preparation date).*

Al-Anazi, et al., "Enhancement of Gas Productivity Using Alcoholic Acids: Laboratory and Field Studies," SPE 102383, 2006.
Settari, et al., "Productivity of Fractured Gas Condensate Wells—A Case Study of the Smorbukk Field," SPE 35604, pp. 305-317, 1996.
Navarrete, et al., "Laboratory, Theoretical, and Field Studies of Emulsified Acid Treatments in High-Temperature Carbonate Formations," SPE Prod. & Facilities, vol. 15, No. 2, pp. 96-106, May 2000.
Norman, et al., "Temperature Stable Acid Gelling Polymers, Laboratory Evaluation and Field Results," SPE 10260, 1981.
Afidick, et al., "Production Performance of a Retrograde Gas Reservoir: A Case Study of the Arun Field," SPE 28749, pp. 73-80, 1994.
Franco, et al., "SDLA: Fighting Skin Damage in Colombian Fields—A War Story," SPE 98136, pp. 1-11, 2006.
Mott, et al., "A New Method of Measuring Relative Permeabilities for Calculataing Gas-Condensate Well Deliverability," SPE 56484, pp. 1-11, 1999.
Buijse, et al., "Novel Application of Emulsified Acids to Matrix Stimulation of Heterogeneous Formations," SPE 39583, pp. 1-12, 1998.
Al-Anazi, et al., "The Impact of Condensate Blockage and Completion Fluids on Gas Productivity in Gas-Condensate Reservoirs," SPE 93210, ,pp. 1-11, 2005.
Taylor, et al., "Optimum Hydrocarbon Fluid Composition for Use in $CO_2$ Miscible Hydrocarbon Fracturing Fluids and Methods of Core Evaluation," Petroleum Society, Canadian Institute of Mining, Metallurgy & Petroleum, Paper 2005-051, pp. 1-13, Jun. 2005.
Garzon, et al., "Laboratory and Field Trial Results of Condensate Banking Removal in Retrograde Gas Reservoirs: Case History," SPE 102558, 2006.
Kumar, et al., "Chemical Stimulation of Gas/Condensate Reservoirs," SPE 102669, 2006.
Alzate, et al., "Evaluation of Alcohol-Based Treatments for Condensate Banking Removal," SPE 98359, p. 1-7, 2006.
Taylor, et al. "Optimized Gas-Well Stimulation Using CO2 Miscible, Viscosified Hydrocarbon Fracturing Fluids," SPE 75666, 2002.
Chatterji, et al., "Applications of Water-Soluble Polymers in the Oilfield," SPE 9288, 1981.

* cited by examiner

Primary Examiner — Timothy J. Kugel
Assistant Examiner — Aiqun Li
(74) Attorney, Agent, or Firm — Robert A. Kent; McDermott Will & Emery LLP

(57) ABSTRACT

Methods that include a method comprising providing a hydrocarbon-acid emulsion composition that comprises an acid phase, a hydrocarbon blend phase, and an emulsifying agent; and placing the hydrocarbon-acid emulsion composition in a subterranean formation. In some embodiments, the hydrocarbon blend phase comprises at least about 65% hydrocarbons having from six carbons ($C_6$) through eleven carbons ($C_{11}$). In other embodiments, the hydrocarbon blend phase has a flash point greater than about 100° F. Additional methods are also provided.

14 Claims, No Drawings

HYDROCARBON-ACID EMULSION COMPOSITIONS AND ASSOCIATED METHODS

BACKGROUND

The present invention relates to hydrocarbon-acid emulsion compositions and methods of using such emulsion compositions in subterranean applications.

Acidizing and fracturing treatments using aqueous acidic solutions commonly are carried out in subterranean formations (including those that contain hydrocarbons as well as those that do not) to accomplish a number of purposes, one of which may be to increase the productivity of the formation.

Acidizing techniques can be carried out as "matrix acidizing" procedures or as "acid fracturing" procedures. Generally, in acidizing treatments, aqueous acidic solutions are introduced into the subterranean formation under pressure so that the acidic solution flows into the pore spaces of the formation to remove near-well formation damage and other damaging substances. The term "damage" as used herein refers to undesirable deposits that may reduce permeability, including, but not limited to, scale, skin, hydrates, geological deposits, deposits from stimulation operations, and/or condensate banking. The acidic solution reacts with acid-soluble materials contained in the formation which may result in an increase in the size of the pore spaces and an increase in the permeability of the formation. This procedure commonly enhances production by increasing the effective well radius. When performed at pressures above the pressure required to fracture the formation, the procedure is often referred to as acid fracturing. Fracture-acidizing involves the formation of one or more fractures in the formation and the introduction of an aqueous acidizing fluid into the fractures to etch the fractures' faces whereby flow channels are formed when the fractures close. The aqueous acidizing fluid also enlarges the pore spaces in the fracture faces and in the formation. The use of the term "acidizing" herein refers to both types of acidizing treatments, and more specifically, refers to the general process of introducing an acid down hole to perform a desired function, e.g., to acidize a portion of a subterranean formation or any damage contained therein.

A variety of acid compositions, including acid-in-oil emulsions, may be used in these acidizing treatments. The use of the term "emulsion" herein refers to a dispersion or suspension of one immiscible liquid in another creating an external phase and an internal phase. In some instances, "acid-in-oil emulsions," wherein the internal phase is an acid and the external phase is a hydrocarbon, have heretofore been used to decrease the rates of acid diffusion and to increase the distance that unspent acid can travel within a formation.

The external oil phase of such acid-in-oil emulsions is typically crude oil or diesel fuel, which provides a barrier to the diffusion and spending of the acid, theoretically allowing unspent acid to be delivered deeply and uniformly into a formation. While the use of crude oil and/or diesel fuel as the external phase in an emulsion can be useful in some instances, it may also have significant drawbacks and disadvantages. For example, the use of diesel fuel may introduce numerous additives that can have an adverse affect on the wetability of the formation, which may result in reduced permeability. Similarly, the use of crude oil introduces impurities, such as paraffin and asphaltenes, into the formation that can reduce the permeability of the formation and ultimately decrease well production.

An additional problem of great concern that may contribute to a decrease in the productivity of a well is condensate banking. The term "condensate banking" and/or "condensate blockage" as used herein refers to the precipitation and/or accumulation of a liquid condensate in a region near a well bore or adjacent to a fracture face, which may occur as a result of, inter alia, gas production from a reservoir flowing at a bottom hole pressure lower than the dewpoint pressure. When stimulation techniques, such as those mentioned above utilizing acid-in-oil emulsions, are performed in dry gas reservoirs and/or subterranean formations that contain condensate blockages, the oil external phase of the emulsion may further reduce the permeability of the formation due in part to the presence of low molecular weight components in the oil external phase, which may not evaporate and thereby lead to phase trapping.

SUMMARY

The present invention relates to hydrocarbon-acid emulsion compositions and methods of using such emulsion compositions in subterranean applications.

In one embodiment, a method of the present invention comprises providing a hydrocarbon-acid emulsion composition that comprises an acid phase, a hydrocarbon blend phase comprising at least about 65% hydrocarbons having from six carbons ($C_6$) through eleven carbons ($C_{11}$), and an emulsifying agent; and placing the hydrocarbon-acid emulsion composition in the subterranean formation.

In another embodiment, a method of the present invention comprises providing an hydrocarbon-acid emulsion composition that comprises an acid phase, a hydrocarbon blend phase that has a flash point greater than about 100° F., and an emulsifying agent; and placing the hydrocarbon-acid emulsion composition in the subterranean formation.

In yet another embodiment, a method of the present invention comprises providing a hydrocarbon-acid emulsion composition that comprises an acid phase, a hydrocarbon blend phase comprising at least about 65% hydrocarbons having from six carbons ($C_6$) through eleven carbons ($C_{11}$), and an emulsifying agent; placing the hydrocarbon-acid emulsion composition in the subterranean formation; and allowing the hydrocarbon-acid emulsion composition to at least partially displace a condensate blockage.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to hydrocarbon-acid emulsion compositions and methods of using such emulsion compositions in subterranean applications. While the hydrocarbon-acid emulsion compositions of the present invention may be useful in a variety of subterranean applications, they may be particularly useful for subterranean well stimulation operations in dry gas reservoirs, gas-condensate subterranean formations, subterranean formations comprising carbonates, and/or subterranean formations comprising "heavy oil."

The hydrocarbon-acid emulsion compositions of the present invention generally comprise an acid phase, a hydrocarbon blend phase, and an emulsifying agent. In one embodiment, the hydrocarbon-acid emulsion compositions of the present invention have a hydrocarbon blend external phase and an acid internal phase. This may be particularly useful, inter alia, in subterranean formations that have low pressures, high temperature, those where it may be desirable to provide fluid loss control, and/or those comprising "heavy oil." The term "heavy oil" as used herein refers to hydrocarbons that comprise a significant amount of paraffin and/or asphaltenic components or hydrocarbons with an API gravity of less than about 22. In another embodiment, the hydrocarbon-acid emulsion compositions may have an acid external phase and a hydrocarbon blend internal phase. This may be particularly useful, inter alia, in subterranean formations that have low temperatures, for example, those with a temperature of about 150° F. or less, and to clean out well bore damage. One of the many advantages of the hydrocarbon-acid emulsion compositions of the present invention is that they may allow for the enhanced productivity of a well. In some embodiments, the hydrocarbon blend phase of the emulsion composition may allow for enhanced productivity, inter alia, by displacing condensate blockages present in a portion of a subterranean formation and/or delaying condensate accumulation in a portion of a subterranean formation. In addition, the acid phase of the emulsion composition may allow for enhanced productivity by acidizing a portion of a subterranean formation.

The acid phase of the hydrocarbon-acid emulsion compositions of the present invention may comprise any acid composition suitable for use in subterranean operations. Examples of suitable acid compositions may include acids, alcoholic acids, acid generating compounds, and combinations thereof. In those embodiments where the emulsion is an acid-external phase, the use of an acid and/or an alcoholic acid, rather than an acid generating compound, may be preferred.

Examples of acids that may be suitable for use in the present invention include, but are not limited to, mineral acids, such as hydrochloric acid and hydrofluoric acid, and organic acids, such as formic acids, acetic acids, citric acids, hydrochloric acid, phosphonic acid, glycolic acids, lactic acids, ethylenediaminetetraacetic acid ("EDTA"), hydroxyethyl ethylenediamine triacetic acid ("HEDTA"), etc., and combinations thereof.

Alcoholic acids that may be suitable for use in the present invention include any mixture of an acid and an alcohol that does adversely interact with the subterranean formation and/or the other components in the hydrocarbon acid-emulsion composition. Examples of suitable alcoholic acids include a mixture of an alcohol, including, but not limited to, methyl alcohol, isopropyl alcohol, propanol, and combinations thereof, and an acid, including but not limited to, hydrochloric acid, hydrofluoric acid, formic acids, acetic acids, citric acids, hydrochloric acid, phosphonic acid, glycolic acids lactic acids, ethylenediaminetetraacetic acid ("EDTA"), hydroxyethyl ethylenediamine triacetic acid ("HEDTA") and combinations thereof.

Examples of suitable acid generating compounds that may be suitable for use in the present invention include, but are not limited to, esters, aliphatic polyesters, ortho esters, poly (ortho esters) (which may also be known as "poly ortho ethers" or "ortho ethers"), poly(lactides), poly(glycolides), poly(ε-caprolactones), poly(hydroxybutyrates), poly(anhydrides), aliphatic polycarbonates, poly(amino acids), poly (ethylene oxide), and polyphosphazenes, or copolymers thereof. Derivatives and combinations also may be suitable. Other suitable acid-generating compounds include: formate esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Other suitable materials may be disclosed in U.S. Pat. Nos. 6,877,563 and 7,021,383, the disclosures of which are incorporated by reference.

In those embodiments where an acid generating compound is used in the acid composition, the acid generating compound may generate an acid down hole in a delayed fashion that may then acidize the formation. The acid generating compounds may be reacted with small amounts of reactive materials such as mineral acids, organic acids, acidic anhydrides, p-toluenesulfonic acid, and the like to lower the pH to accelerate the hydrolysis of the acid generating compound 1f desired. Similarly, the hydrolysis rate may be slowed by the addition of a small amount of a strong base such as NaOH, $Na_2CO_3$, and $Mg(OH)_2$. The acid generating compound also may generate alcohols downhole that may be beneficial to the operation. These alcohols may act as surface tension reducers to keep any nonemulsifiers and surface tension reducers in solution so that they are not absorbed into the formation. Additionally, these alcohols may be used to at least partially remove condensate blocks, or move or prevent water blocks in the formation. These alcohols may also act as hydrate inhibitors. Delayed generation of these alcohols can be beneficial in other ways as well. For instance, the production of these alcohols downhole may give the distinct advantage of being able to provide the alcohols downhole without having to pump them. This may be beneficial, for example, in some areas, where it may be problematic to pump an alcohol (e.g., when the environment has a temperature that is greater than the flash point of the alcohol or when environmental or cultural regulations do not permit the pumping of such alcohols), the delayed generation may be useful. Also, these generated alcohols may be preferred over standard alcohols because some standard alcohols contain chemical inhibitors that may interact with the chemistry within the well bore in such a way as to be problematic. Moreover, shipping and storing standard alcohols may be problematic. The particular alcohol given off depends on the acid generating compound being used. For instance, trimethylorthoformate gives off three molecules of methanol for each molecule of formic acid; the methanol may be useful for hydrate inhibition.

In certain embodiments, the concentration of the acid phase in the hydrocarbon-acid emulsion compositions of the present invention may range from about 5% to about 95%, depending on which phase of the emulsion the acid phase comprises. In other embodiments, the concentration of the acid phase in the hydrocarbon-acid emulsion compositions of the present invention may range from about 60% to about 80%, depending on which phase of the emulsion the acid phase comprises. The particular concentration used in any particular embodiment depends on, inter alia, what acid composition is being used, whether the acid phase is internal or external, the desired viscosity and/or stability of the emulsion composition, and in the embodiments where an acid-generating compound is used, the percentage of acid generated. Other complex, interrelated factors that may be considered in deciding how much of the acid composition to use include, but are not limited to, the composition of the formation, the temperature of the formation, the pressure of the formation, the particular fines and damage present in the formation (e.g., scale, skin, calcium carbonate, silicates, and the like), the particular acid composition used, the expected contact time of the acid with the formation, etc. The desired contact time also depends on the particular application and purpose. One of ordinary skill in the art with the benefit of this disclosure will be able to select an appropriate concentration of the acid composition in light of these considerations.

The concentration of the hydrocarbon blend phase in the hydrocarbon-acid emulsion compositions of the present invention may range from about 5% to about 95%. In some embodiments, the concentration of the hydrocarbon blend phase in the hydrocarbon-acid emulsion compositions of the present invention may range from about 20% to about 40%. The particular concentration used in any particular embodiment depends on, inter alia, what hydrocarbon blend is being used and whether the hydrocarbon blend phase is internal or external. Other complex, interrelated factors that may be considered in deciding how much of the hydrocarbon blend to use include, but are not limited to, the composition of the formation, the temperature of the formation, the pressure of the formation, the particular fines and damage present in the formation (e.g., scale, skin, calcium carbonate, silicates, and the like), etc. The desired contact time also depends on the particular application and purpose. One of ordinary skill in the art with the benefit of this disclosure will be able to select an appropriate concentration of the hydrocarbon blend in light of these considerations.

In some embodiments, the hydrocarbon blend phase of the hydrocarbon-acid emulsion compositions of the present invention may comprise a hydrocarbon blend that comprises at least about 65% hydrocarbons having from six carbons ($C_6$) through eleven carbons ($C_{11}$). The hydrocarbon blends that are a component of the hydrocarbon-acid emulsion compositions of the present invention, are comprised primarily of hydrocarbons of chain length $C_{10}$ or less. In other embodiments, the hydrocarbon blend phase of the hydrocarbon-acid emulsion compositions of the present invention may comprise a hydrocarbon blend that has a flash point greater than about 100° F. One advantage of these hydrocarbon-acid emulsion compositions is that the hydrocarbon phase may exhibit increased volatility, which may aid in recovering the hydrocarbon-acid emulsion composition from the subterranean formation once the treatment, such as acid fracturing or matrix acidizing, is complete. Generally speaking, the more volatile the hydrocarbon phase, the greater the rate and completeness of recovery of the emulsion composition. However, use of a too volatile hydrocarbon phase may be impractical and may present a safety hazard. One of the many advantages of the present invention is in providing an hydrocarbon phase that provides enhanced volatility, while remaining safe to handle with conventional equipment.

In other embodiments, the hydrocarbon blend phase of the hydrocarbon-acid emulsion compositions of the present invention may comprise hydrocarbon blends that comprise at least about 65% hydrocarbons having from seven carbons ($C_7$) through ten carbons ($C_{10}$). In still other embodiments, the hydrocarbon blend phase may comprise a hydrocarbon blend that comprises less than about 5% hydrocarbons greater than $C_{10}$, or less than about 5% hydrocarbons below $C_7$, or both.

In some embodiments, the hydrocarbon blend phase of the hydrocarbon-acid emulsion compositions of the present invention may exhibit a Reid Vapor Pressure below about 2 psi. Reid Vapor Pressure is a measurement of a fluid's volatility. Industry standards generally call for maintaining the Reid Vapor Pressure of servicing fluids below about 2 psi to help ensure that the servicing fluid is safe for use.

The hydrocarbon-acid emulsion compositions of the present invention further comprise an emulsifying agent. The emulsifying agent may be any emulsifying agent that does not adversely affect the emulsion composition and functions to at least partially stabilize the hydrocarbon-acid emulsion composition. In some embodiments, where the hydrocarbon blend phase is the external phase, examples of suitable emulsifying agents include fatty alkanol amides and a blend of an amphoteric amine salt, a phosphate ester, an ethoxylated dialkyl phenol and a propylene glycol ether. In addition, examples of other suitable emulsifying agents include those available under the trade names AF-61® and AF-70®, which are commercially available from Halliburton Inc., in Duncan, Okla. In other embodiments, where the acid phase is the external phase, examples of suitable emulsifying agents include those available under the trade names WS-36°, which is commercially available from HydroChem Industrial Services, Inc., in Deer Park, Tex. and SEM-7®, which is commercially available from Halliburton Inc., in Duncan, Okla.

Optionally, the hydrocarbon-acid emulsion compositions of the present invention may further comprise a gelling agent. In deciding whether to use a gelling agent and which kind to use, one may consider the following factors: the formation temperature, the length of treatment design (time-wise), the desired break mechanism of the gelling agent; and the purpose for which the gelling agent has been included in the fluid. Any gelling agent suitable for use in subterranean applications may be used in these fluids, including, but not limited to, natural biopolymers, synthetic polymers, cross linked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives and combinations of all of the above. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents are polymers and/or copolymers consisting of various ratios of acrylic, acrylamide, acrylamidomethylpropane sulfonic acid, quaternized dimethylaminoethylacrylate, quaternized dimethylaminoethylmethacrylate, mixtures thereof, and the like. Examples may be shown in these references, the disclosures of which are incorporated herein by reference, Chatterji, J. and Borchardt, J. K.: "Applications of Water-Soluble Polymers in the Oilfield," paper SPE 9288 presented at the 1980 Annual Technical Conference, Dallas, Tex., September 21-24; Norman, L. R., Conway, M. W., and Wilson, J. M.: "Temperature-Stable Acid Gelling Polymers: Laboratory Evaluation and Field Results," paper SPE 10260 presented at the 1981 Annual Technical Conference, San Antonio, Tex., Oct. 5-7; Bouwmeester, Ron, C. M. US Patent Application 2005/0197257; Tackett, Jr., U.S. Pat. No. 5,082,056; Crowe, Curtis, W. European Patent Application 0 278 540; and Nehmer, Warren L GB 2163790. In other embodiments, the gelling agent may be depolymerized. The term "depolymerized," as used herein, generally refers to a decrease in the molecular weight of the gelling agent. Depolymerized gelling agents are described in U.S. Pat. No. 6,488,091 issued Dec. 3, 2002 to Weaver, et al., the relevant disclosure of which is incorporated herein by reference. If used, a gelling agent may be present in the hydrocarbon-acid emulsion compositions of the present invention in an amount in the range of from about 0.01% to about 5% by weight of the base fluid therein.

The hydrocarbon-acid emulsion compositions of the present invention may further comprise additional additives as deemed appropriate by one of ordinary skill in the art, with the benefit of this disclosure. Examples of such additional additives include, but are not limited to, pH-adjusting agents, pH-buffers, oxidizing agents, enzymes, lost circulation materials, scale inhibitors, surfactants, clay stabilizers, corrosion inhibitors, paraffin inhibitors, asphaltene inhibitors, penetrating agents, clay control additives, iron control additives, chelators, reducers, oxygen scavengers, sulfide scavengers, emulsifiers, foamers, gases, derivatives thereof and combinations thereof, and the like.

In certain embodiments, the hydrocarbon-acid emulsion compositions of the present invention may comprise particulate materials, e.g., proppant or gravel, that can be utilized, for example, in stimulation or completion operations. Suitable particulate materials include, but are not limited to, low-density particulates (e.g., those that have a specific gravity that is less than sand), solid acid such as citric acid or polylactic acid, graded walnut or other nut shells, resin-coated walnut or other nut shells, graded sand, resin-coated sand, sintered bauxite, various particulate ceramic materials, glass beads, various particulate polymeric materials, and the like. The particular size of the particulate material employed may depend on the particular application for which the particulate materials are being used, characteristics of the subterranean formation, characteristics of the particular hydrocarbon-acid emulsion compositions being used, as well as other variables known to those skilled in the art with the benefit of this disclosure. Generally, the particulate sizes may vary in the range of from about 2 to about 400 mesh, U.S. Sieve Series scale. In one embodiment, the particulates may be present in the hydrocarbon-acid emulsion compositions of the present invention in an amount less than about 20 lbs/gallon of the emulsion composition. In other embodiments, the particulates may be present in the hydrocarbon-acid emulsion compositions of the present invention in an amount less than about 14 lbs/gallon of the emulsion composition. One of ordinary skill in the art with the benefit of this disclosure will be able to determine the type and amount of particulate suitable for use in the operation at issue.

The hydrocarbon-acid emulsion compositions of the present invention may be prepared by any suitable method. For instance, in some embodiments, the emulsion may be batch mixed or mixed "on-the-fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In some embodiments, where the emulsion is prepared by batch mixing, a batch mixer may be used, which is generally equipped with a means of adding dry and/or liquid chemicals and an agitation or circulation system. One of ordinary skill in the art with the benefit of this disclosure will be able to select an appropriate method of preparation.

In certain embodiments, the hydrocarbon-acid emulsion compositions of the present invention may be useful in matrix acidizing applications, acidizing applications, fracture acidizing applications, scale removal applications, damage removal applications, hydrate treatment applications, hydrate inhibition applications, condensate removal applications, condensate inhibition applications, stimulation operations of water injection wells, and heavy oil cleanup operations.

In certain embodiments, a method of the present invention may comprise: providing a hydrocarbon-acid emulsion composition that comprises an acid phase, a hydrocarbon blend phase comprising at least about 65% hydrocarbons having from six carbons ($C_6$) through eleven carbons ($C_{11}$), and an emulsifying agent; and placing the hydrocarbon-acid emulsion composition in the subterranean formation.

In other embodiments, a method of the present invention may comprise: providing an hydrocarbon-acid emulsion composition that comprises an acid phase, a hydrocarbon blend phase that has a flash point greater than about 100° F., and an emulsifying agent; and placing the hydrocarbon-acid emulsion composition in the subterranean formation.

In another embodiment, a method of the present invention may comprise: providing a hydrocarbon-acid emulsion composition that comprises an acid phase, a hydrocarbon blend phase comprising at least about 65% hydrocarbons having from six carbons ($C_6$) through eleven carbons ($C_{11}$), and an emulsifying agent; placing the hydrocarbon-acid emulsion composition in the subterranean formation; and allowing the hydrocarbon-acid emulsion composition to at least partially displace a condensate blockage.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   placing an acid-internal hydrocarbon-acid emulsion composition in a subterranean formation wherein the hydrocarbon-acid emulsion composition comprises:
   an acid phase, wherein the acid in the acid phase comprises an acid generating compound selected from the group consisting of ortho ester, poly(ortho ester), poly (hydroxybutyrate), poly(anhydride), aliphatic polycarbonate, poly(amino acid), poly(ethylene oxide), polyphosphazene, and a combination thereof;
   a hydrocarbon blend phase in an amount in the range of from about 50% to about 95% by volume of the hydrocarbon-acid emulsion, wherein the hydrocarbon blend phase comprises at least about 65% hydrocarbons having from six carbons ($C_6$) through eleven carbons ($C_{11}$); and,
   an emulsifying agent, wherein the hydrocarbon-acid emulsion does not comprise a viscosity reducing agent.

2. The method of claim 1 wherein the hydrocarbon-acid emulsion composition is placed in the subterranean formation at a pressure sufficient to create or enhance a fracture in the subterranean formation.

3. The method of claim 1 wherein placing the hydrocarbon-acid emulsion composition in the subterranean formation comprises placing the hydrocarbon-acid emulsion composition in a well bore penetrating the subterranean formation.

4. The method of claim 1 wherein the hydrocarbon blend phase comprises less than about 5% hydrocarbons having more than ten carbons ($C_{10}$).

5. The method of claim 1 wherein the hydrocarbon blend phase comprises less than about 5% hydrocarbons having fewer than seven carbons ($C_7$).

6. The method of claim 1 wherein the hydrocarbon blend comprises substantially no hydrocarbons having more than eleven carbons ($C_{11}$).

7. The method of claim 1 wherein the hydrocarbon-acid emulsion composition further comprises particulates.

8. The method of claim 1 wherein the emulsifying agent is selected from the group consisting of a fatty alkanol amide and a blend of an amphoteric amine salt, a phosphate ester, an ethoxylated dialkyl phenol, and a propylene glycol ether.

9. A method comprising:
providing an acid-internal hydrocarbon-acid emulsion composition that comprises:
an acid phase,
wherein the acid in the acid phase comprises an acid generating compound selected from the group consisting of ortho ester, poly(ortho ester), poly(hydroxybutyrate), poly(anhydride), aliphatic polycarbonate, poly(amino acid), poly(ethylene oxide), polyphosphazene, and a combination thereof;
a hydrocarbon blend phase that has a flash point greater than about 100° F. and comprises at least about 65% hydrocarbons having from six carbons ($C_6$) through eleven carbons ($C_{11}$) in an amount in the range of from about 85% to about 95% by volume of the hydrocarbon emulsion,
wherein the hydrocarbon blend phase comprises less than about 5% hydrocarbons having more than ten carbons ($C_{10}$) and comprises less than about 5% hydrocarbons having fewer than seven carbons ($C_7$); and,
an emulsifying agent,
wherein the hydrocarbon-acid emulsion does not comprise a viscosity reducing agent; and,
placing the hydrocarbon-acid emulsion composition in a subterranean formation.

10. The method of claim 9 wherein the hydrocarbon-acid emulsion composition is placed in the subterranean formation at a pressure sufficient to create or enhance a fracture in the subterranean formation.

11. The method of claim 9 wherein placing the hydrocarbon-acid emulsion composition in the subterranean formation comprises placing the hydrocarbon-acid emulsion composition in a well bore penetrating the subterranean formation.

12. The method of claim 9 wherein the hydrocarbon blend phase has a Reid vapor pressure below about 2 psi.

13. The method of claim 9 wherein the emulsifying agent is selected from the group consisting of a fatty alkanol amide and a blend of an amphoteric amine salt, a phosphate ester, an ethoxylated dialkyl phenol, and a propylene glycol ether.

14. A method of treating at least a portion of a subterranean formation comprising:
providing an acid-internal hydrocarbon-acid emulsion composition that comprises an acid phase, a hydrocarbon blend phase comprising at least about 65% hydrocarbons having from six carbons ($C_6$) through ten carbons ($C_{10}$) in an amount in the range of from about 85% to about 95% by volume of the hydrocarbon emulsion, and an emulsifying agent, wherein the hydrocarbon-acid emulsion does not comprise a viscosity reducing agent;
wherein the acid in the acid phase comprises an acid generating compound selected from the group consisting of ortho ester, poly(ortho ester), poly(hydroxybutyrate), poly(anhydride), aliphatic polycarbonate, poly(amino acid), poly(ethylene oxide), polyphosphazene, and a combination thereof;
wherein the emulsifying agent is selected from the group consisting of a fatty alkanol amide combined with an amphoteric amine salt, a phosphate ester, and a propylene glycol ether; and,
placing the hydrocarbon-acid emulsion composition in a subterranean formation; and
allowing the hydrocarbon-acid emulsion composition to at least partially displace a condensate blockage.

* * * * *